US011474976B1

(12) United States Patent
Santhanam et al.

(10) Patent No.: US 11,474,976 B1
(45) Date of Patent: Oct. 18, 2022

(54) MULTI-LEVEL DATA DE-DUPLICATION USING MULTI-INSTANCE STORAGE

(71) Applicant: Amazon Technologies, Inc., Seattle, WA (US)

(72) Inventors: Aravind Santhanam, Redmond, WA (US); Shane Anil Pereira, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/362,086

(22) Filed: Jun. 29, 2021

Related U.S. Application Data

(60) Provisional application No. 63/201,690, filed on May 8, 2021.

(51) Int. Cl.
*G06F 16/00* (2019.01)
*G06F 16/174* (2019.01)
*G06F 16/17* (2019.01)

(52) U.S. Cl.
CPC ...... *G06F 16/1748* (2019.01); *G06F 16/1734* (2019.01)

(58) Field of Classification Search
CPC .................. G06F 16/1748; G06F 16/1734
See application file for complete search history.

(56) References Cited

U.S. PATENT DOCUMENTS

2017/0277711 A1\* 9/2017 Therrien ............. G06F 16/1748

\* cited by examiner

*Primary Examiner* — Tyler J Torgrimson
(74) *Attorney, Agent, or Firm* — Lowenstein Sandler LLP

(57) ABSTRACT

A system and method relating to multi-level data de-duplication operations relating to data records associated with multiple user systems. The system includes a first set of computing instances execute a first set of de-duplication operations to generate a set of locally de-duplicated files associated with a data stream comprising the data records associated with the user systems. The system includes a storage system to store the set of locally de-duplicated files. The system includes a second set of computing instances to receive, in accordance with a frequency type of multiple frequency types, the set of locally de-duplicated files from the storage system and execute a second set of de-duplication operations to generate a set of globally de-duplicated files associated with the data records.

20 Claims, 6 Drawing Sheets

MULTI-LEVEL DATA DE-DUPLICATION USING MULTI-INSTANCE STORAGE

CROSS-REFERENCE TO RELATED APPLICATION

This application claims the benefit of U.S. Provisional Patent Application No. 63/201,690, filed May 8, 2021, titled "Data de-duplication using multi-instance storage", the entirety of which is hereby incorporated by reference herein.

BACKGROUND

Data processing services (e.g., a security service) process a large number of data records on behalf of multiple different users (e.g., customers). The data records can include key/value pairs that are processed by the service to generate corresponding findings. For example, data security services and threat monitoring services monitor and analyze continuous streams of data records associated with respective users to identify threats and attacks to protect the user data records stored in a storage system. However, existing systems provide users with findings that are updated frequently such that the systems publish several service-related findings corresponding to the same data record to the user. The provisioning of duplicate files creates significant noise on the user-side, which prevents the efficient execution of responsive or remedial actions. Accordingly, there is a need for the de-duplication of the data files to eliminate duplicate records and provide accurate updates to the user.

BRIEF DESCRIPTION OF THE FIGURES

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
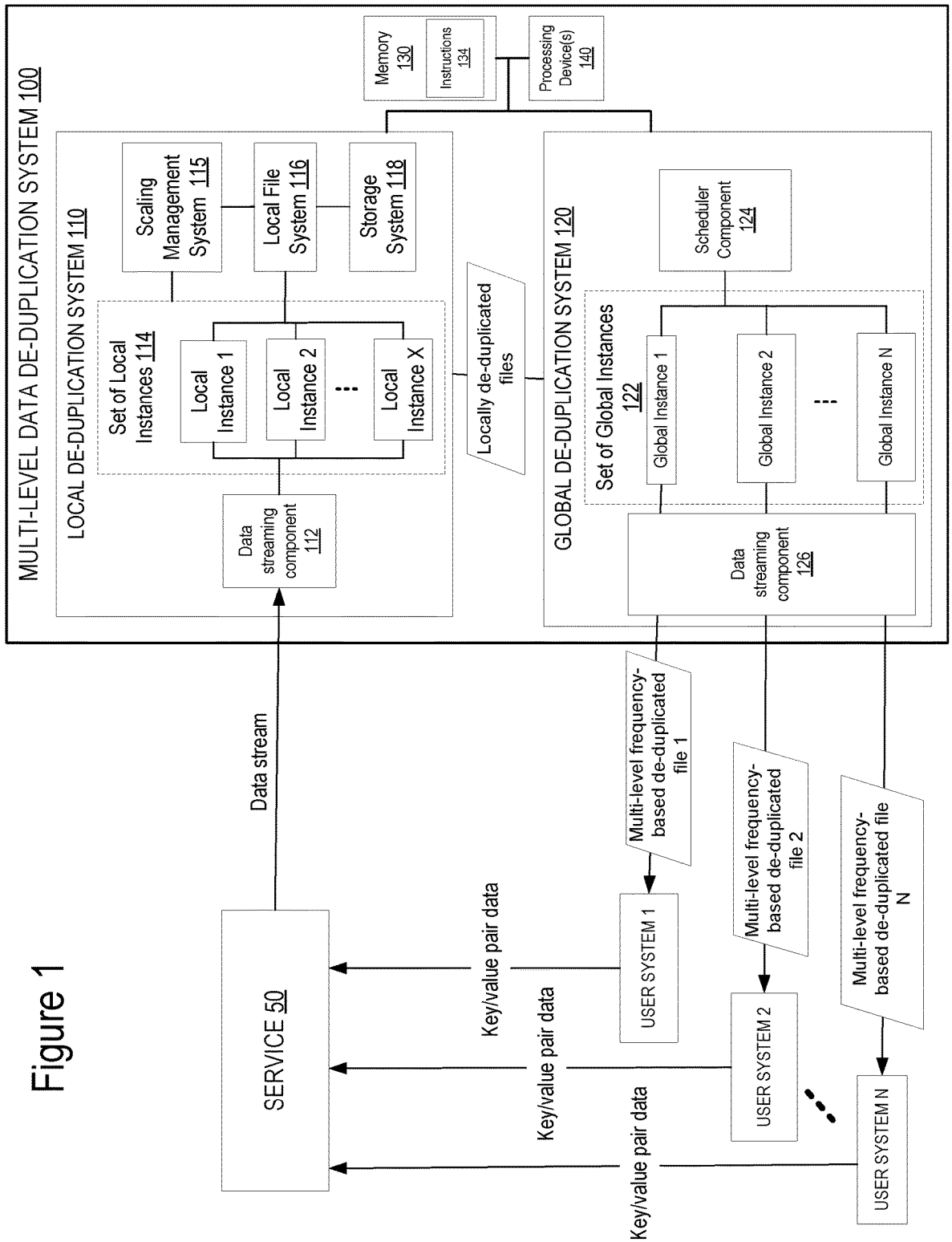
FIG. 1 is a block diagram of a system to perform multi-level data de-duplication relating to a data stream provided by a service associated with data of multiple user systems, in accordance with embodiments of the present disclosure.

This disclosure is directed to de-duplication of data records. Embodiments of the disclosure are directed to local and global data de-duplication to eliminate duplicate copies of repeating data and maintain only a latest version of frequent updates to the same data. The data de-duplication processing according to embodiments of the present disclosure includes the execution of local de-duplication operations and the execution of global de-duplication operations (e.g., multiple levels of de-duplication processing). The local de-duplication operations of a first stage of the multi-level de-duplication processing are performed by a first set of multiple computing instances (herein referred to as "local instances") to generate locally de-duplicated data files based on data records received from a service during a particular time interval (e.g., data records received during a previous N minute time interval). The data records can be received from a service (e.g., a security service performing security-related processing of data records received from multiple user systems (e.g., users or customers of the service)). Each local instance receives a set of data records over the period of time (e.g., the N minute period) and performs the local de-duplication operation to de-duplicate the received set of data records to generate the one or more locally de-duplicated data files. The local de-duplication operation performed by each local instance can identify one or more duplicate data records of the data records processing by the respective local instance during the time interval. The local de-duplication processing performed by each local instance eliminate any duplicates from the set of data records processed by that local instance during the time interval to generate the locally de-duplicated data files including a latest version of each data record of the set of data record.

Typical approaches to de-duplication processing involve the use of a single computing instance. In these approaches, all of the data records are hashed into the single computing instance for de-duplication. Accordingly, the scale of the de-duplication processing is limited by the size of the single instance.

Advantageously, as compared to these approaches, embodiments of the present disclosure employ multiple local instances that are each configured to execute de-duplication operations on a corresponding set of data records. The use of a multi-instance storage system where different versions of the same data record can be processed by any number of local instances provides for greater scalability that is not limited by the size of a single computing instance.

In an embodiment, during a second stage of the multi-level de-duplication processing, a second set of multiple computing instances of a global de-duplication system receive the locally de-duplicated data files and perform "global" de-duplication operations to generate multi-level (e.g., local-level de-duplication by a respective local instance and global-level de-duplication by a respective global instance) frequency-based de-duplicated data files. In accordance with a particular frequency type associated with each key of the key/value pair of a locally de-duplicated data file, each of the multiple global instances receives (e.g., downloads) a set of locally de-duplicated data files and performs a "global" de-duplication operation to identify one or more duplicate data records and eliminate any duplicates from the set of locally de-duplicated data records.

In an embodiment, the frequency type represents a maximum time duration (e.g., 15 minutes, 1 hour, 6 hours, etc.) in which data records associated with a user system that are provided by the service to the multi-level de-duplication system are to undergo the global de-duplication processing. In an embodiment, based on the frequency type selected by a user system, each global instance downloads from the storage system a portion of the locally de-duplicated data files associated with a particular bin. In an embodiment, each key/value pair is mapped or designated for storage within a particular bin of the storage system, such that all locally de-duplicated data files associated with a particular key/value pair (e.g., key 1/value) are stored in the same bin (e.g., bin 1). Accordingly, a global instance can download all of the locally-de-duplicated data files from a particular bin (e.g., bin 1) to enable the global de-duplication processing to be performed on all of the files for that particular key/value pair (e.g., key 1/Value). In an embodiment, each global instance can determine if locally de-duplicated files relating to multiple versions of data records associated with the same key/value pair (e.g., key 1/Value/Version1, key 1/Value/Version2, etc.) have been generated by multiple different local instances during the local de-duplication processing stage. As used herein, the term "Version1" is also referred to as "V1", "Version2" is referred to as "V2", etc.

In an embodiment, each of the global instances processes a set of one or more locally de-duplicated data files from a particular bin associated with a particular key/value pair and associated frequency type. In an embodiment, the frequency type can be selected by a user system and is applied for each data record (e.g., key/value pair) originating from that user system that is processed by the multi-level de-duplication system. In an embodiment, the frequency type is configurable by each user system (e.g., user or customer providing data records to the service) and can be updated, changed, or modified at any time.

For example, a particular key/value pair of a data record originating from a first user system can be associated with a first frequency type, as selected by the user system. In an embodiment, at a time interval associated with the first frequency type (e.g., 15 minute frequency), a global instance can download each locally de-duplicated data file from a bin mapped to the particular key/value pair which may have been processing during the initial stage by multiple different local instances. Accordingly, at each interval of the selected frequency type (e.g., every 15 minutes), the multi-level de-duplication processing can be performed to generate a locally and globally de-duplicated data file to provide to the user system.

In an embodiment, a number of instances of the local de-duplication system can be auto-scaled (i.e., the number of instances can be dynamically increased or decreased). In this embodiment, the number of local instances can be automatically scaled based on a size of the local bin file. For example, the local de-duplication system may, at a first time, include N number of local instances and N number of corresponding bins. If a large number of key/value pairs are received, the size of the local bin files increases. When the bin file size increases to a high level, it takes an increased amount of time for the global de-duplication system to download the large bin files and perform the global de-duplication processing (e.g., the downloading and processing time can exceed the frequency level (e.g., 15 minutes) associated with the key/value pair and corresponding bin).

To address and overcome the problems associated with the processing of large bin files by a typical system, the multi-level de-duplication system according to embodiments of the present disclosure can add one or more additional local instances to the local de-duplication system in response to satisfaction of a first condition. In an embodiment, the first condition is satisfied when a size of a local bin file increases to a size that exceeds a maximum threshold level (e.g., 100 MB). In the example above, in response to satisfying the first condition, the multi-level de-duplication system can add Y number of local instances, thereby increasing the number of local instances to N+Y.

Similarly, in an embodiment, the multi-level de-duplication system according to embodiments of the present disclosure can reduce the number of local instances in response to satisfying a second condition. In an embodiment, the second condition is satisfied when a size of a local bin file decreases below a minimum threshold level (e.g., 10 KB). Accordingly, if the size of the bin files is decreasing due to a reduction in the key/value pair traffic and falls below the minimum threshold level, the multi-level de-duplication system can auto-scale down and decrease the number of local instances.

Embodiments address the technical problems associated with efficiently performing data de-duplication processing of frequently updated data records (e.g., key/value pair data records) associated with multiple user systems. According to embodiments of the present disclosure, the multi-level data de-duplication system includes a first set of multiple computing instances to perform a first stage of data de-duplication processing on a per-instance basis at set time intervals (e.g., every 5 minutes) to generate a set of locally de-duplicated files maintained in a storage system.

In an embodiment, each user system can select a frequency type that is associated with one or more key/value pairs of the one or more data records processed by the multi-level de-duplication system. At each interval of the selected frequency type (e.g., every 15 minutes), the global de-duplication system of the multi-level de-duplication system download locally de-duplicated bin files perform global de-duplication processing to generate a multi-level frequency-based de-duplicated file to provide to the respective user system.

Advantageously, the multi-instance multi-level de-duplication system can implement auto-scaling processing to enable an increase or decrease in a number of local instances that are created and employed. In an embodiment, the number of local instances can be auto-scaled based on a factor such as bin file size. In an embodiment, in response to determining size of one or more of the bin files of the local file system exceeds a maximum threshold level, one or more local instances can be created. In an embodiment, in response to determining size of one or more of the bin files of the local file system falls below a minimum threshold level, one or more local instances can be removed or deleted.

The techniques and systems described herein may be implemented in a number of ways. Example implementations are provided below with reference to the following figures.

FIG. 1 is a block diagram of a system 100 to perform multi-level data de-duplication relating to a data stream provided by a service 50 associated with data of multiple respective user systems. The system 100 (herein referred to as the "multi-level data de-duplication system 100) is in communication with the service 50 to receive the data stream corresponding to underlying user system data (e.g., key/value pair data) provided to the service 50 by the multiple respective user systems (e.g., user system 1, user system 2, . . . user system N). According to embodiments, the service 50 is a data processing service that processes and performs functionality with respect to user system data records (e.g., key/value pair data records) provided to the service 50 by one or more user systems. Example services 50 include an external security service such as Amazon Macie service, the Amazon GuardDuty service, etc. that perform data protection and threat monitoring services associated with the user data records.

For example, the service 50 can provide threat detection that enables the user systems to monitor and protect accounts, workloads, and data stored in a storage system (e.g., storage system 118). In an example, the service 50 can analyze continuous streams of key/value pair data from each user system to generate a data stream including related findings (e.g., threat-related findings) associated with the key/value pair data. In an example, the service 50 can manage data security and data privacy using machine learning and pattern matching to discover and protect user system key/value pair data.

According to embodiments, the system 100 receives the data stream including the key/value pair data of the multiple user systems (e.g., user system 1, user system 2, . . . user system N of FIG. 1) and performs multi-level data de-duplication processing to identify and track a latest update for one or more keys for a specified time duration (also referred to as a "frequency type") and publishes or provides a multi-level frequency-based de-duplicated file including a latest update or version to a corresponding user system.

As shown in FIG. 1, the system 100 includes a local de-duplication system 110 and a global de-duplication system 120. In an embodiment, the local de-duplication system 110 includes a first set of computing instances 114 (e.g., storage and computing instances configured to generate local files (also referred to as "local bin files") for storage in a storage system 118) including multiple "local" instances (e.g., local instance 1, local instance 2, . . . local instance X as shown in FIG. 1). The set of local instances 114 are configured to ingest portions or shards of the data stream from a data streaming component 112 and perform local de-duplication operations on a per-instance basis for a particular time interval. According to embodiments, on a periodic basis (e.g., according to a particular time interval such as every 5 minutes), each local instance receives a portion of the data records of the data stream from the data streaming component 112 and performs a local de-duplication operation on that portion of the data records. For example, at a first time (e.g., at the end of the particular time interval, such as after a 5 minute period of time), local instance 1 receives a first portion of the data stream from the data streaming component 112, local instance 2 receives a second portion of the data stream from the data streaming component 112, and local instance N receives an Nth second portion of the data stream from the data streaming component 112.

According to embodiments, the data streaming component 112 collects, processes, and stores the real-time data stream of data records (e.g., key/value pairs) from the service 50 and randomly assigns each data record (key/value pair) to a shard or sequence of data records each having a sequence number of a set of shards. In an embodiment, the data records are injected by the service 50 into the data streaming component 112 at different times.

The data streaming component 112 indexes the data stream of data records into the individual shards of the set of shards. In an embodiment, the set of shards of the data streaming component includes X number of shards, such that there is a one-to-one correspondence between the number of shards and the number of local instances (e.g., there are X number of shards and X number of local instances, where each shard is associated with a respective local instance. In an embodiment, the data streaming component 112 represents the set of shards where each shard has a sequence of a portion of the data records. An example data streaming component 112 includes the Amazon Kinesis Data Stream.

In an embodiment, each data record is loaded into the data streaming component 112 with a randomly-generated partition key, such that multiple data records with the same key can be assigned to any shard in the data streaming component 112. In view of the random assignment of the data records to the respective shards, multiple data records associated with a same key (e.g., data record 1 associated with key 1/value/V1 and data record 2 associated with key 1/value/V2) can be assigned to different shards (e.g., data record 1 is assigned to shard 1 and data record 2 is assigned to shard 2). In an embodiment, each local instance is assigned or dedicated to a particular shard (e.g., local instance 1 receives a first portion of the sequence of data records of the data stream from a first shard, local instance 2 receives a second portion of the sequence of data records of the data stream from a second shard, and local instance N receives an Nth portion of the sequence of data records of the data stream from an Nth shard. As a result, multiple different local instances can receive and process data records associated with the same key (e.g., data record 1 associated with key 1/value/V1 can be processed by local instance 1 and data record 2 associated with the same key (e.g., key 1/value/V2) can be processed by local instance 2.

In an embodiment, each of the local instances in the set of local instances 114 generates, for each time interval (e.g., every 5 minutes) a file including "locally" de-duplicated data corresponding to the portion of the data records processed by the respective local instance. In an embodiment, each key of the key/value pairs is mapped to a bin of the local file system 116. In an embodiment, the local file system 116 includes multiple bin files each defined in terms of the mapped key and frequency type. In an embodiment, there is a one-to-one correspondence between the number of local instances (e.g., the X number of local instances in FIG. 1) and the number of bins of the local file system 116. For example, the local file system 116 can include a set of bins including a first bin, a second bin, . . . and an Xth bin. In an embodiment, the files including the locally de-duplicated data (also referred to as "locally de-duplicated files") are identified in the local file system 116 by a key/value path including information identifying a corresponding local instance that generated the file, a bin identifier (e.g., a bin number) mapped to the underlying key of the data record stored in the file, and a frequency type associated with the key/value record. In an embodiment, the frequency type represents a maximum time duration (e.g., 15 minutes, 1 hour, 6 hours, etc.) in which findings are to be "globally" de-duplicated by the global de-duplication system 120.

In an embodiment, the frequency type is configurable by each user system (e.g., user or customer providing data records to the service) and can be updated, changed, or modified at any time. For example, a first user system can select and use a first frequency type of 15 minutes, a second user system can select and use a second frequency type of 1 hour, etc. In this example, the first user system selects the first frequency type indicating that the first user system is to receive de-duplicated data records (e.g., notification of keys with a latest version) after every 15 minutes.

In an embodiment, on a periodic basis (e.g., every 5 minutes), the locally de-duplicated files are flushed from the local file system into the storage system 118. In an embodiment, according to the established time period or interval (e.g., every 5 minutes), the locally de-duplicated data is flushed from the local file system 116 to the storage system 118 (e.g., an object storage service such as Amazon Simple Storage Service (S3)) and the corresponding file is deleted from the local file system 116. In an embodiment, the execution of the local de-duplication operations by the respective local instances of the set of local instances 114 to generate the local de-duplicated files and the flushing of those files to the storage system is performed in accordance with the established time period (e.g., every 5 minutes). Aspects an examples of the functionality performed by the local de-duplication system 110 are described in greater detail below with reference to FIG. 2.

According to embodiments, the locally de-duplicated files are retrieved (e.g., downloaded) from the storage system 118 by the global de-duplication system 120. The global de-duplication system 120 includes a set of "global" instances 122 configured to execute global de-duplication operations with respect to the locally de-duplicated files. In an embodiment, the global de-duplication system 120 includes a scheduler component 124 configured to schedule the global de-duplication operations on a per-bin basis in accordance with the applicable frequency type (e.g., a first frequency type having a 15 minute interval, a second frequency type having a 1 hour interval, etc.).

For example, each bin of the storage system 118 can include multiple locally de-duplicated files relating to the same key/value pair in accordance with the key-to-bin mapping. In an embodiment, a global instance processes each file in a respective bin that relates to a same key. For example, global instance 1 of the set of global instances 122 can be assigned to perform a global de-duplication operation for a first set of files in a first bin (e.g., bin 1) at a first frequency type (e.g., every 15 minutes), global instance 2 can be assigned to perform a global de-duplication operation for a second set of files in a second bin (e.g., bin 2) at the first frequency type (e.g., every 15 minutes), and global instance 3 can be assigned to perform a global de-duplication operation for a third set of files in the first bin (e.g., bin 1) at a second frequency type (e.g., every 1 hour). In this regard, each user system selects or assigns a desired frequency type for each key which indicates the frequency with which the global de-duplication system 122 performs the global de-duplication operation to generate a file including a latest or updated version of the key/value pair. In an embodiment, the global de-duplication system 122 performs the global de-duplication operation at the selected frequency type, generates a latest version of the multi-level de-duplicated data, and sends a data stream including information identifying the latest version of the multi-level de-duplicated data to a corresponding user system via a data streaming component 126. Aspects an examples of the functionality performed by the global de-duplication system 120 are described in greater detail below with reference to FIG. 4.

In an embodiment, the multi-level de-duplication system 100 includes a scaling management system 115 to monitor the files of the local file system 116 and perform scaling operations relating to the number of local instances of the set of local instances 114. In an embodiment, the scaling management system 115 can auto-scale (i.e., dynamically increase or decrease the number of instances). In this embodiment, the number of local instances can be automatically scaled by the scaling management system 115 based on a size of the local bin file. For example, the local de-duplication system may, at a first time, include N number of local instances and N number of corresponding bins of the local file system 116. If a large number of key/value pairs are received via the data stream, the size of the local bin files increases. When the bin file size increases to a high level, it takes an increased amount of time for the global de-duplication system 120 to download the large bin files and perform the global de-duplication processing (e.g., the downloading and processing time can exceed the frequency level (e.g., 15 minutes) associated with the key/value pair and corresponding bin).

Advantageously, the scaling management system 115 according to embodiments of the present disclosure can add one or more additional local instances to the set of local instance 114 in response to satisfaction of a first condition. In an embodiment, the first condition is satisfied when a size of a local bin file increases to a size that exceeds a maximum threshold level (e.g., 100 MB). In the example above, in response to satisfying the first condition, the scaling management system 115 can add Y number of local instances, thereby increasing the number of local instances to N+Y.

Similarly, in an embodiment, the scaling management system 115 according to embodiments of the present disclosure can reduce the number of local instances in response to satisfying a second condition. In an embodiment, the second condition is satisfied when a size of a local bin file decreases below a minimum threshold level (e.g., 10 KB, 100 KB, etc.). Accordingly, if the size of the bin files is decreasing due to a reduction in the key/value pair traffic and falls below the minimum threshold level, the scaling management system 115 can auto-scale down and decrease the number of local instances.

According to embodiments, the multi-level de-duplication system 100 includes a memory 130 storing instructions 134 executable by one or more processing devices 140 to perform the operations and functionality associated with the various components, services, and modules of the multi-level de-duplication system 100, as described in detail herein in connection with FIGS. 1-6. According to embodiments, memory 130 can include any suitable memory device, such as, for example, e.g., read-only memory (ROM), flash memory, dynamic random access memory (DRAM) such as synchronous DRAM (SDRAM)), a static memory (e.g., flash memory, static random access memory (SRAM)), and a data storage device, which communicate with each other via a bus. According to embodiments, the one or more processing devices 140 represents one or more general-purpose processing devices such as a microprocessor, central processing unit, or the like. More particularly, the processing device 140 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The one or more processing devices 140 may also be one or more special-purpose processing devices such as an application specific integrated circuit (ASIC), a field programmable gate array (FPGA), a digital signal processor (DSP), network processor, or the like. In various implementations of the present disclosure, the processing device 140 is configured to execute instructions 134 to perform the operations and processes associated with the multi-level de-duplication system 100, described in detail herein.

Figure 2:
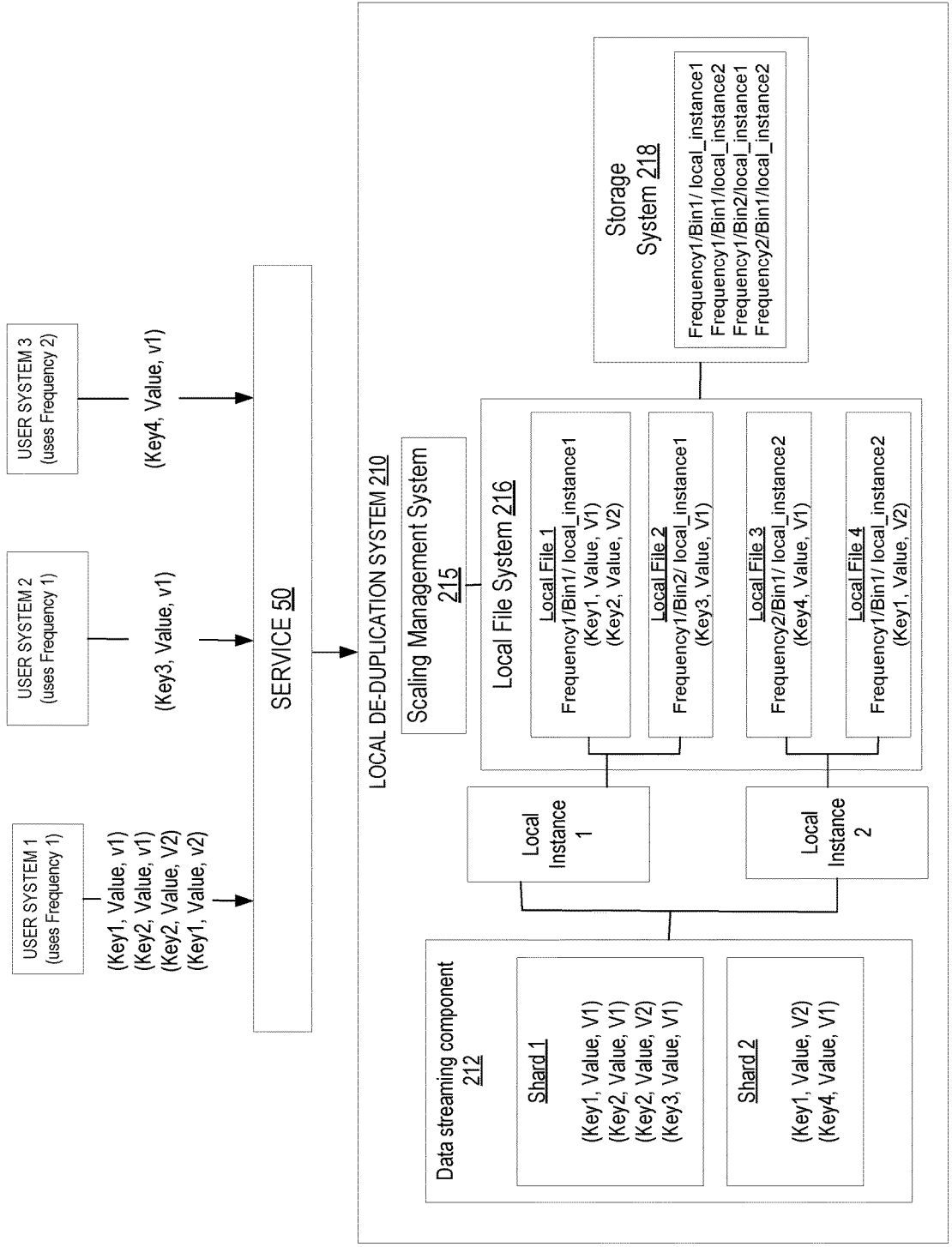
FIG. 2 is a block diagram of an example local de-duplication system of a multi-level de-duplication system, in accordance with embodiments of the present disclosure.

FIG. 2 illustrates an example local de-duplication system 210 of a multi-level de-duplication system (e.g., multi-level de-duplication system 100 of FIG. 1), in accordance with embodiments of the present disclosure. The local de-duplication system 210 includes a set of multiple computing instances configured to process the data records associated with the respective shards of the data streaming component 212. In an embodiment, each local instance is dedicated or assigned to a respective shard in the data stream. For example, a first instance is dedicated to consuming a first portion or sequence of the data records from a first shard, a second instance is dedicated to consuming a second portion or sequence of the data records from a second shard, and so on for each shard of the data stream. Accordingly, in an embodiment, a local instance is provided and dedicated to processing a corresponding data stream from an associated shard (i.e., local instance 1 processes the data records from shard 1, local instance 2 process the data records from shard 2, . . . and local instance N processes the data records from shard N), such that there is a one-to-one correspondence between the shards and the local instances.

As shown in the example of FIG. 2, the local de-duplication system 210 includes a data streaming component 212 configured to receive a data stream from a service 50 including a sequence of data records associated with respective user systems. In the example shown, user system 1 sends a set of data records including a first data record corresponding to key 1 (key 1, value, V1), a second data record corresponding to key 2 (key 2, value, V1), a third data record corresponding to key 2 (key 2, value, V2), and a fourth data record corresponding to key 1 (key 1, value, V2). In the example shown, user system 2 sends a data record corresponding to key 3 (key 3, value, V1) data record and user system 4 sends a data record corresponding to key 4 (key4, value, V1).

As shown in FIG. 2, portions of the data stream are randomly assigned to respective shards (e.g., shard 1 and shard 2) of the data streaming component. In this example, a first portion of the data stream including the following data records is assigned to shard 1: (key 1, value, V1), (key 2, value, V1), (key 2, value V2) and (key 3, value, v1). In addition, as shown in FIG. 2, a second portion of the data stream including the following data records is randomly assigned to shard 2: (key 1, value, V2) and (key4, value, V1). In an embodiment, local instance 1 is mapped to shard 1 such that the first portion of the data records in shard 1 are provided to local instance 1 for local de-duplication processing. Similarly, local instance 2 is mapped to shard 2 such that the second portion of the data records in shard 2 are provided to local instance 2 for local de-duplication processing.

In an embodiment, on a periodic basis (e.g., at the end of a particular time interval such as every 5 minutes), each local instance consumes a portion of the data records from the corresponding shard and executes a local de-duplication operation. In an embodiment, each local instance locally de-duplicates the set of data records that it has received over the previous time period. In an embodiment, the local de-duplication operation includes the deletion or removal of one or more repeat or duplicate data records in the portion of data records received from the corresponding shard during the applicable time interval.

In the example shown in FIG. 2, local instance 1 performs a local de-duplication operation on the first portion of data records including (key 1, value, V1), (key 2, value, V1), (key 2, value V2) and (key 3, value, v1) to generate local files (e.g., local file 1 and local file 2) maintained in the local file system 216. In this example, local instance 2 performs a local de-duplication operation on the second portion of data records including (key 1, value, V2) and (key4, value, V1) to generate local files (e.g., local file 3 and local file 4) maintained in the local file system 216.

As shown in FIG. 2, the local de-duplication operation performed by local instance 1 identifies multiple versions corresponding to a same key/value pair (e.g., (key 2, value, V1) and (key 2, value, V2)). Accordingly, as a result of the local de-duplication operation executed by local instance 1, the local file 1 is generated which includes the latest version (e.g., V2) of the key 2/value pair and deletes or removes the key 2/value/V1 record.

In the example in FIG. 2, each local file is generated based on a corresponding frequency type/bin identifier pair. In this example, user system 1 is associated with (e.g., selected) frequency type 1 (e.g., a 15 minute frequency), user system 2 is associated with frequency type 1 (e.g., the 15 minute frequency) and user system 3 is associated with frequency type 2 (e.g., a 1 hour frequency). As shown, local file 1 is generated by local instance 1 and includes locally de-duplicated data records collected in shard 1 during the applicable time period (e.g., during a previous 5 minute period) that are associated with a frequency type 1/bin 1 pair; local file 2 is generated by local instance 2 and includes locally de-duplicated data records collected in shard 1 during the applicable time period that are associated with a frequency type 1/bin 2 pair; local file 2 is generated by local instance 1 and includes locally de-duplicated data records collected in shard 1 during the applicable time period that are associated with a frequency type 1/bin 1 pair, as denoted by the respective file path identifiers.

As shown, local file 3 is generated by local instance 2 and includes locally de-duplicated data records collected in shard 2 during the applicable time period that are associated with a frequency type 2/bin 1 pair and local file 4 is generated by local instance 2 and includes locally de-duplicated data records collected in shard 2 during the applicable time period that are associated with a frequency type 1/bin 1, as denoted by the respective file path identifiers.

As illustrated in this example, the random assignment of the portions of data records to the respective shards (and corresponding mapping to a respective local instance) results in multiple data records relating to a same key (e.g., key 1) being processed by different local instances (e.g., local instance 1 processes (key 1, value, V1) and local instance 2 processes (key 1, value, V2). It is noted that, as a result, the local de-duplication operations performed by the respective local instances do not de-duplication those data records at the local-level.

In an example, the respective local files can be generated and flushed to the storage system 218 and have a respective file path identifier including information identifying the corresponding local instance identifier, bin identifier, and frequency type associated with the particular key (e.g., frequency type 2 associated with key 1). As such, in this example, at the end of the applicable time interval (e.g., every 5 minutes), the local files are flushed to the storage system 219 and assigned a corresponding file path identifier which identifies the associated frequency type, bin identifier, and the associated local instance. In this example, local file 1 is flushed from the local file system 216 into the storage system 218 and has a first file path identifier of "Frequency1/Bin1/local_instance1", a second local file is flushed from the local file system 216 into the storage system 218 and has a second file path identifier of "Frequency1/Bin2/local_instance1", and so on. In an embodiment, the file path identifier can also include information identifying an actual time slot associated with the file. For example, a file generated based on a first time interval (e.g., 0 to 5 minutes) can be associated with a first time slot, a file generated based on a second time interval (e.g., 5 minutes to 10 minutes) can be associated with a second time slot, and so on.

Figure 3:
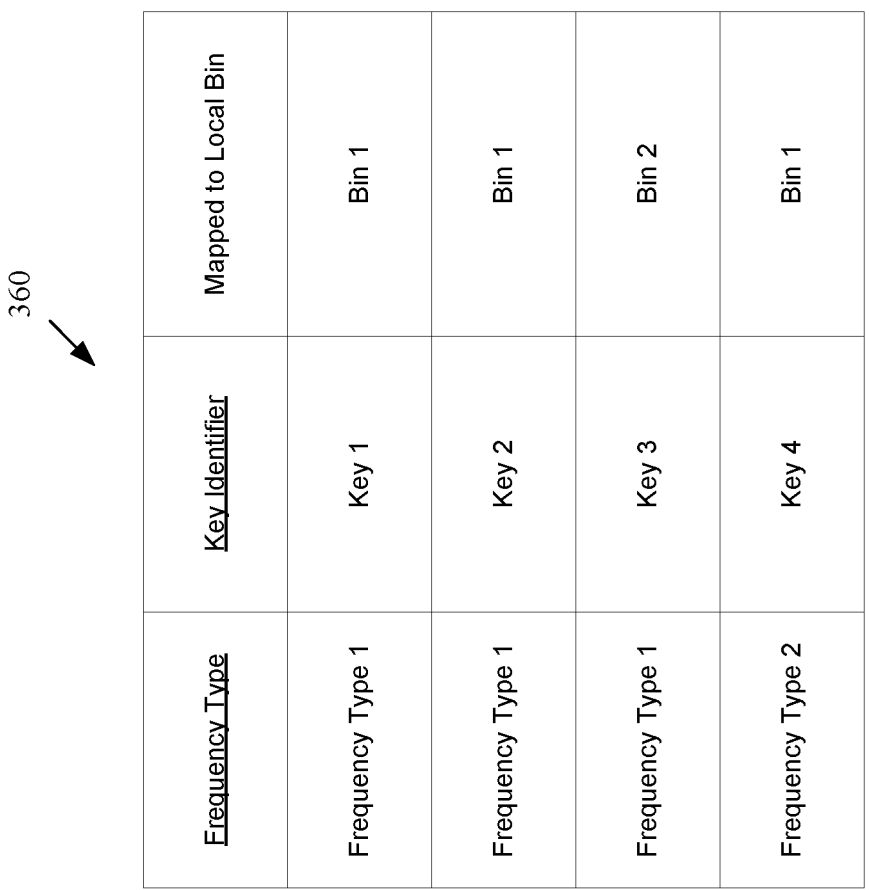
FIG. 3 illustrates an example data structure maintained by processing logic of the local de-duplication system that includes a mapping between respective key, an applicable frequency type, and corresponding bin identifier, in accordance with embodiments of the present disclosure.

FIG. 3 illustrates an example data structure 360 that can be maintained by processing logic of the local de-duplication system 112, 212 that includes a mapping between the respective key identifiers (e.g., key 1, key 2, key 3, and key 4), an applicable frequency type (e.g., frequency type 1 and frequency type 2), and a corresponding bin (e.g., Bin 1 and Bin 2). As shown in FIG. 3, the local instances can use the mapping information of the data structure 360 to determine the appropriate mapping of each key to a corresponding frequency type/bin pair for purposes of creating the local files.

In another example, a first key (key 1) can be assigned to bin 1. During an applicable time period (e.g., 5 minutes), multiple data records associated with key 1 (e.g., (key 1, value, V1), (key 1, value, V2), and (key 1, value, V3) can be consumed by multiple different instances (e.g., instance 1, instance 2 and instance 3). In this example, a first data record (key 1, value, V1) can be processed by local instance 1, a second data record (key 1, value, V2) can be processed by local instance 2, and a third data record (key 1, value, V3) can be processing by local instance 3. Since the three data records are all associated with the same key (key 1), the corresponding files are assigned to the same bin (e.g., bin 1). In this example, the respective local files can be generated and flushed to the storage system and have a respective file path identifier including information identifying the corresponding local instance identifier, bin identifier, and frequency type associated with the particular key (e.g., frequency type 1 associated with key 1). As such, in this example, at the end of the applicable time interval (e.g., 5 minutes), the local files are flushed to the storage system and assigned a corresponding file path identifier. In this example, a first local file is flushed to the storage system having a first file path identifier such as "FrequencyType1/bin1/instance1", a second local file is flushed to the storage system having a second file path identifier such as "FrequencyType1/bin1/instance2", and a third local file is flushed to the storage system having a third file path identifier such as "FrequencyType1/bin1/instance3", where each file relating to key 1 is assigned to bin1 to enable global de-duplication processing during a next stage of the multi-level de-duplication process, as described in greater detail with reference to FIG. 4.

In an embodiment, a number of local instances of the local de-duplication system 210 can be dynamically or automatically scaled by a scaling management system 215 to either increase a total number of local instances or decrease a total number of local instances in view of a level of traffic of the incoming data stream (e.g., a number of data records being processed by the local de-duplication system 210). In an embodiment, the scaling management system 215 can manage a scaling protocol to determine whether the number of local instances is to be increased or decreased. In an embodiment, the number of local instances can be automatically scaled by the scaling management system 215 based on a size of the local bin file. For example, the local de-duplication system 210 may, at a first time, include N number of local instances and N number of corresponding bins. If a large number of key/value pairs are received, the size of the local bin files increases. In an embodiment, if a file size of one or more bin files of the local de-duplication system 210 satisfies a first condition, the scaling management system 215 of the local de-duplication system 210 can scale the set of local instances to include one or more additional local instances. In an embodiment, the first condition is satisfied when a file size of one or more bin files exceeds a first or maximum threshold level (e.g., 100 MB). Accordingly, in response to determining that the first condition is met, the scaling management system 215 of the local de-duplication system 210 can increase the number of local instances from N to N+L, where L is any integer value.

In an embodiment, in view of the increase to the number of local instances, a corresponding number of shards can be added to the data streaming component, such that the one-to-one correspondence between the shards and the local instances is maintained.

In an embodiment, in the event the level of traffic in the data stream decreases, the bin file size may also decrease. In an embodiment, if the file size of one or more of the bin files of the local de-duplication system satisfies a second condition, the scaling management system 215 of the local de-duplication system 210 can decrease the number of local instances. In an embodiment, the second condition is satisfied when a file size of one or more bin files is less than a second or minimum threshold level (e.g., 10 KB). Accordingly, in response to determining that the second condition is met, the scaling management system 215 of the local de-duplication system 210 can decrease the number of local instances from N to N-L, where L is any integer value.

In an embodiment, in view of the decrease to the number of local instances, a corresponding number of shards of the data streaming component can be decreased, such that the one-to-one correspondence between the shards and the local instances is maintained.

Advantageously, the auto-scaling of the number of local instances in view of conditions associated with the bin file size enables the local de-duplication system 210 to dynamically adjust to the level of traffic of the incoming data stream. In an embodiment, at times of heavier traffic, additional local instances can be added to perform the local de-duplication processing and generate smaller bin file sizes (e.g., below the maximum threshold level). Maintaining bin file sizes within the minimum threshold level and the maximum threshold level results in manageable bin files that can be downloaded and processed efficiently by the global de-duplication. This further enables the generation and transmission of the multi-level frequency-based de-duplicated files within the time period associated with the selected frequency type.

Figure 4:
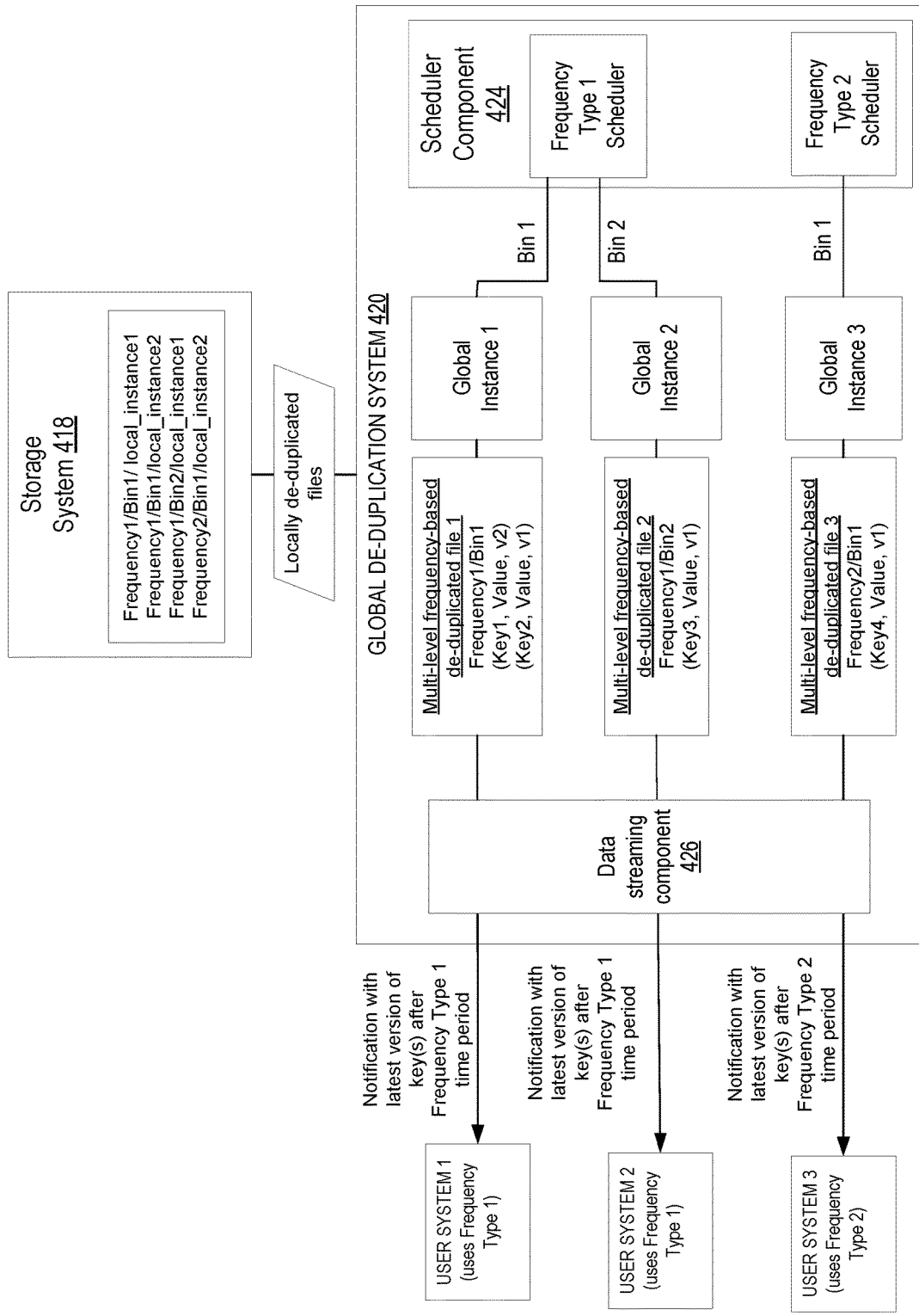
FIG. 4 illustrates an example global de-duplication system of a multi-level de-duplication system, in accordance with embodiments of the present disclosure.

FIG. 4 illustrates an example global de-duplication system 420 of a multi-level de-duplication system (e.g., multi-level de-duplication system 100 of FIG. 1), in accordance with embodiments of the present disclosure. The global de-duplication system 420 shown in the example of FIG. 4 is configured to download or otherwise receive the locally de-duplicated files generated by the local de-duplication system (e.g., local de-duplication system 112 of FIG. 1 or local de-duplication system 212 of FIG. 2). In an embodiment, the global de-duplication system 420 includes a set of multiple "global" computing instances configured to perform global de-duplication processing of respective portions of the locally de-duplicated files data records associated with the respective shards of the data streaming component 212. In an embodiment, in the example shown in FIG. 4, during a second stage of the multi-level de-duplication processing, the second set of multiple computing instances (e.g., global instance 1, global instance 2, and global instance 3) perform the global de-duplication operations to generate multi-level (e.g., local-level de-duplication by a respective local instance and global-level de-duplication by a respective global instance) frequency-based de-duplicated data files.

In an embodiment, each global instance is configured to receive a set of bin files from a particular bin in accordance with a particular frequency type. In an embodiment, the frequency type represents a maximum time duration (e.g., 15 minutes, 1 hour, 6 hours, etc.) in which data records associated with a user system that are provided by the service to the multi-level de-duplication system are to undergo the global de-duplication processing to enable the sending of notifications to the respective user systems indicating a latest version of the associated keys.

In an embodiment, the global de-duplication system 420 includes a scheduler component 424 which manages the scheduling of the global de-duplication processing in accordance with the respective frequency types (e.g., frequency type 1 and frequency type 2 of FIG. 4). In an embodiment, at a time corresponding to frequency type 1 (e.g., every 15 minutes), the scheduler component 424 instructs one or more of the global instances to download the bin files that correspond with keys that are to be processed according to frequency type 1 (e.g., as selected by the user system). In an embodiment, at a time corresponding to frequency type 2 (e.g., every 1 hour), the scheduler component 424 instructs one or more of the global instances to download the bin files that correspond with keys that are to be processed according to frequency type 2 (e.g., as selected by the user system). According to embodiments, the bin files corresponding to each respective frequency can be identified for download based on the associated bin file path identifier which includes the frequency type and bin identifier information.

As shown in the example of FIG. 4, global instance 1 receives instruction from the scheduler component 424 to download and perform de-duplication processing on a first portion of the locally de-duplicated files from bin1 at frequency type 1 (e.g., 15 minute time intervals). In this example, global instance 2 receives instruction from the scheduler component 424 to download and perform de-duplication processing on a second portion of the locally de-duplicated files from bin2 at frequency type 1. Furthermore, in this example, global instance 3 receives instruction from the scheduler component 424 to download and perform de-duplication processing on a second portion of the locally de-duplicated files from bin1 at frequency type 2 (e.g., 1 hour time intervals).

According to embodiments, the particular frequency type is selected by each respective user system and associated with each key of the key/value pair of a locally de-duplicated data file. In the example shown in FIG. 5, user system 1 selects or uses frequency type 1 (e.g., 15 minutes) to enable the transmitting of notifications identifying a latest version of the keys associated with user system 1 based on the multi-level frequency-based de-duplicated files at frequency type 1 (e.g., every 15 minutes). In the example shown in FIG. 5, user system 2 also selects frequency type 1 and receives notifications identifying a latest version of the keys associated with user system 2 based on the multi-level frequency-based de-duplicated files every 15 minutes. Furthermore, in the example shown in FIG. 5, user system 3 selects frequency type 2 (e.g., 1 hour) and receives notifications identifying a latest version of the keys associated with user system 3 based on the multi-level frequency-based de-duplicated files every 1 hour.

As shown in the example of FIG. 4, global instance 1 performs the de-duplication processing at associated frequency type 1 to generate multi-level frequency-based de-duplicated file 1 which includes de-duplicated data corresponding to frequency type 1/bin 1. As shown, as a result of the de-duplication processing, multi-level frequency-based de-duplicated file 1 removed the (key 1, value, v1) record (originally generated by local instance 1 and stored in local file 1 of FIG. 2) and maintained the latest version of key 1 (e.g., key 1, value, v2). Similarly, in the example shown in FIG. 4, global instance 2 performs the de-duplication pro-cessing at associated frequency type 1 to generate multi-level frequency-based de-duplicated file 2 which includes de-duplicated data corresponding to frequency type 1/bin 2.

In the example shown, global instance 3 performs the de-duplication processing at associated frequency type 2 (e.g., every 1 hour) to generate multi-level frequency-based de-duplicated file 3 which includes de-duplicated data corresponding to frequency type 2/bin 1.

As shown in FIG. 4, the data streaming component 426 can be employed to stream notifications including information identifying a latest version of each key to the user systems based on the multi-level frequency-based de-duplicated files.

For example, during a given one hour time period (e.g., from 12:00 PM PST to 1:00 PM PST), if frequency type 1 is 15 minutes, the global de-duplication system 420 can perform de-duplication processing of one or more bin files relating to key 1, key 2, and key 3 at four different times (e.g., at 12:15 PM, 12:30 PM, 12:45 PM and 1:00 PM), since keys 1, 2, and 3 are associated with frequency type 1. In this example, if frequency type 2 is 1 hour, the global de-duplication system 420 can perform de-duplication processing of one or more bin files relating to key 4 once during the 12:00 PM PST to 1:00 PM PST time period, since key 4 is associated with frequency type 2. In this example, user system 1 (i.e., the originator of data records associated with keys 1 and 2) receives notifications every 15 minutes (e.g., 4 notifications) during the identified time period which each include information identifying a latest version of keys 1 and 2. In this example, user system 2 (i.e., the originator of data records associated with key 3) receives notifications every 15 minutes (e.g., 4 notifications) during the identified time period which each include information identifying the latest version of key 3. In addition, in this example, user system 3 (i.e., the originator of data records associated with key 4) receives one notification during the identified time period which includes information identifying the latest version of key 4.

Figure 5:
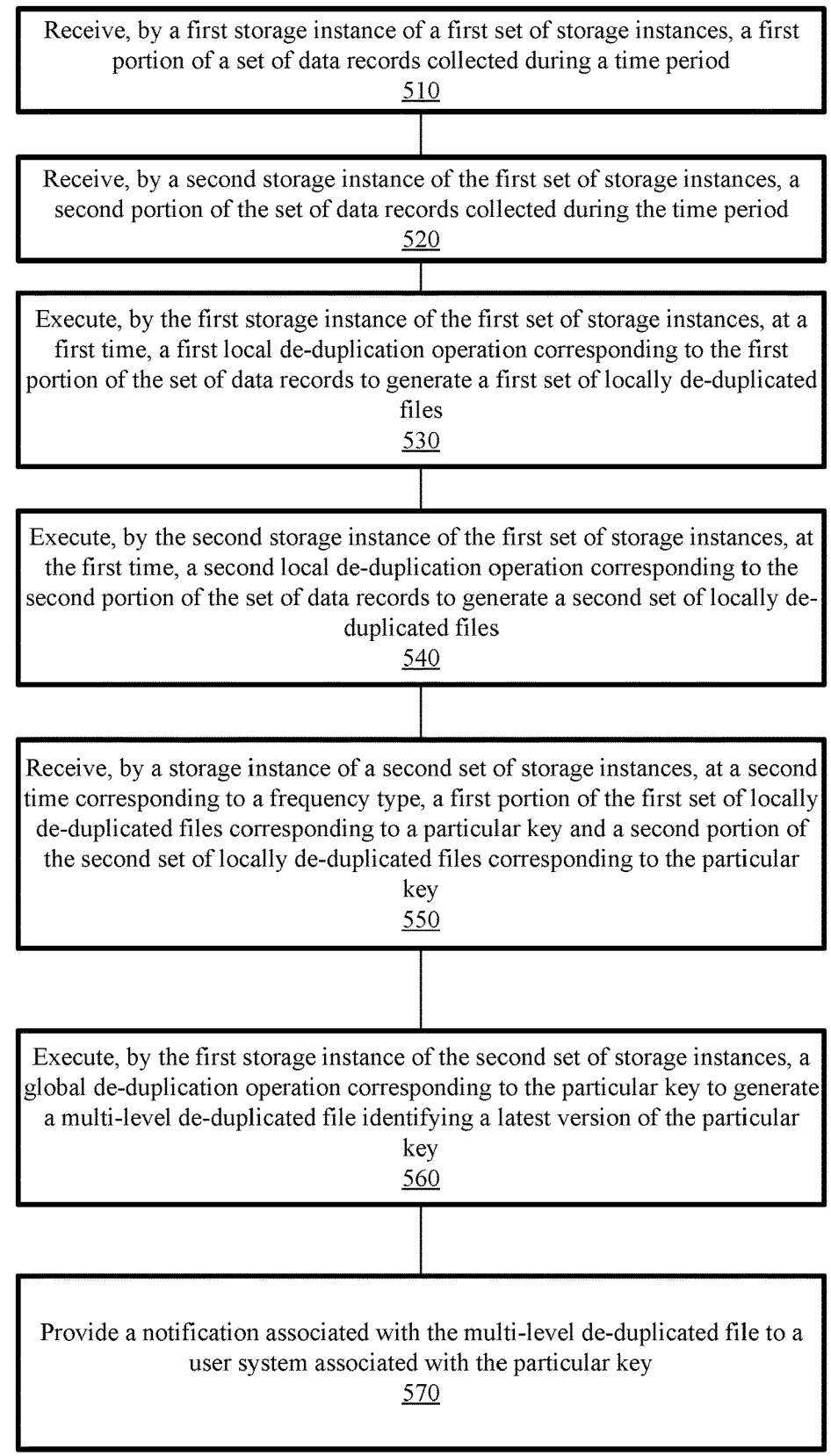
FIG. 5 is a flow diagram of an illustrative process to execute multi-level data de-duplication processing, in accordance with embodiments of the present disclosure.

FIG. 5 is a flow diagram of an illustrative method 500 including operations performed by multiple sets of computing instances to locally and globally de-duplicate data records associated with one or more user systems, in accordance with one embodiment. The method may be performed by a processing logic of a system (e.g., multi-level data de-duplication system 100 of FIG. 1) that may comprise hardware (e.g., circuitry, dedicated logic, programmable logic, microcode, etc.), software (e.g., instructions (e.g., instructions 134 stored in a memory (e.g., memory 130) executed by one or more processing devices (e.g., processing device(s) 140 of FIG. 1)), or a combination thereof. The processing logic may execute on one or many processing devices in a cloud environment. Where the processing logic is distributed across multiple processing devices, each of the processing devices may perform one or more of the operations for a method. Method 500 may be performed periodically in accordance with the one or more frequency types, as described in detail above. The processing logic may correspond to one or more of the multi-level data de-duplication system 100, local de-duplication system 110, 210 and/or global de-duplication system 120, 420 of FIGS. 1, 2, and 4, according to embodiments.

At operation 510, processing logic (e.g., processing logic associated with the local de-duplication system 110 of the multi-level data de-duplication system 100 of FIG. 1) receives, by a first instance of a first set of computing instances, a first portion of a set of data records collected during a time period. In an embodiment, the first set of computing instances includes the set of local computing instances 114 of FIG. 1. In an embodiment, the data records are received from a service (e.g., service 50 of FIG. 1) and include information relating to key/value pairs provided by one or more user systems (e.g., user system 1, user system 2, . . . user system N of FIG. 1). In an example, the first computing instance of the first set of computing instances includes local computing instance 1 of FIGS. 1 and 2. In an example, the first portion of the set of data records includes the portion of data records associated with shard 1 of data streaming component 212 of FIG. 2. In an example, the first portion includes data records relating to (key 1, value, V1), (key2, value, V1), (key2, value, V2), and (key3, value, V1) of shard 1 of the data streaming component 212 of FIG. 2. In an embodiment, the first time period associated with operation 510 can be any predetermined or selected time interval, such as, for example, a time period of 5 minutes. In an embodiment, the first portion of data records of a data stream are collected over the first time period by a corresponding shard and received by the first computing instance at an end of the first time period.

At operation 520, the processing logic receives, by a second computing instance of the first set of computing instances, a second portion of the set of data records collected during the time period. In an example, the second computing instance of the first set of computing instances includes local computing instance 2 of FIGS. 1 and 2. In an example, the second portion of the set of multiple data records includes the portion of data records associated with shard 2 of data streaming component 212 of FIG. 2. In an example, the second portion includes data records relating to (key1, value, V2) and (key4, value, V1) collected by shard 2 of the data streaming component 212 of FIG. 2 during the time period (e.g., during a 5 minute time period).

At operation 530, the processing logic associated with the first computing instance of the first set of computing instances executes, at a first time, a first local de-duplication operation corresponding to the first portion of the set of data records to generate a first set of locally de-duplicated files. In an embodiment, the first computing instance performs the first local de-duplication operation to identify and remove duplicates from the first portion of the set of multiple data records. With reference to the example shown in FIG. 2, the execution of the first local de-duplication operation by local computing instance 1 results in the identification and removal of (key2, value, V1) since a later or more recent version (key2, value, V2) corresponding to the same key (key2) is identified with the first portion of the set of data records. In an example, the first set of locally de-duplicated files includes local file 1 and local file 2 in local file system 216 of FIG. 2. In an embodiment, the first time associated with operation 530 can be a time following the time period identified in operation 510. For example, the first time can follow the first time period (e.g., after the 5 minute time period during which the data records are collected and consumed by the first computing instance).

At operation 540, the processing logic associated with the second computing instance of the first set of computing instances executes, at the first time, a second local de-duplication operation corresponding to the second portion of the set of data records to generate a second set of locally de-duplicated files. In an embodiment, the second computing instance performs the second local de-duplication operation to identify and remove duplicates from the second portion of the set of data records. In an example, the second set of locally de-duplicated files includes local file 3 and local file 4 in local file system 216 of FIG. 2. As noted above, in an embodiment, the first time associated with operation 540 can be a time following the time period identified in operation 510. For example, the first time can follow the first time period (e.g., after the 5 minute time period during which the data records are collected and consumed by the second computing instance).

At operation 550, the processing logic of a computing instance of a second set of computing instances receives, at a second time corresponding to a frequency type, a first portion of the first set of locally de-duplicated files corresponding to a particular key and a second portion of the second set of locally de-duplicated files corresponding to the particular key. In an embodiment, the second set of computing instances includes the set of global instances 122 of FIG. 1. In an example, the computing instance of the second set of computing instances of operation 550 includes global instance 1 of FIGS. 1 and 4.

In an example, the computing instance receives (e.g., downloads) the first portion of the first set of locally de-duplicated files and the second portion of the second set of locally de-duplicated files includes all of the files from a particular bin (e.g., bin 1) that are associated with the particular key (e.g., key 1) in accordance with the frequency type.

In an embodiment, the frequency type represents a maximum time duration (e.g., 15 minutes, 1 hour, 6 hours, etc.) in which findings will be de-duplicated and notified after that time duration. In an embodiment, the frequency type is configurable by each user system (e.g., user or customer providing data records to the service) and can be updated, changed, or modified at any time. For example, a first user system can select and use a first frequency type (e.g., frequency type 1) of 15 minutes, a second user system can select and use a second frequency type of 1 hour, etc. In this example, the user system associated with the particular key selects the first frequency type indicating that the first user system is to receive multi-level de-duplicated data every 15 minutes.

In an embodiment, in accordance with the frequency type associated with the underlying key/user system (e.g., every 15 minutes), the computing instance (e.g., global instance 1) downloads all of the files relating to a particular key from the associated bin (i.e., in view of the mapping between the keys and bins). In an embodiment, the second time associated with operation 550 is any time following the completion of a previous time interval associated with the applicable frequency type (e.g., a time following a 15 minute interval of frequency type 1). For example, with reference to FIG. 4, the computing instance (e.g., global instance 1) receives local file 1 (i.e., the first portion of the first set of locally de-duplicated files including information relating to key1 (e.g., the particular key) as processed by local instance 1) and local file 4 (i.e., the second portion of the second set of locally de-duplicated files also including information relating to key1 as processed by local instance 2).

In an embodiment, the set of locally de-duplicated files including the locally de-duplicated data (e.g., key/value records such as key 1/value/V1) stored in the storage system are identified by a key/value path including information identifying a corresponding local instance, a bin identifier (e.g., bin number) which is the source of the locally de-duplicated data, and a frequency type associated with the key/value record.

At operation 560, the processing logic of the computing instance of the second set of computing instances executes a global de-duplication operation corresponding to the particular key to generate a multi-level de-duplicated file identifying a latest version of the particular key. In an embodiment, the global de-duplication operation is performed by a global computing instance (e.g., global instance 1 of FIGS. 1 and 4) to remove or delete data relating to duplicate or earlier versions of the particular key and identify a latest or most recent version of the particular key. With reference to the example shown in FIGS. 2 and 4, the global de-duplication operation is performed by global instance 1 to delete (key1, value, V1) and identify (key1, value, V2) as the latest version of the particular key (key1).

At block 570, the processing logic provides a notification associated with the multi-level de-duplicated file to a user system associated with the particular key. In an embodiment, the notification is provided to the user system in accordance with the frequency type selected by that user system. For example, if the user system selected frequency type 1 of 15 minutes, a new and updated notification including multi-level de-duplicated data is provided to the user system every 15 minutes. In an example, at a first frequency type 1 mark (e.g., following a first 15 minute interval), a first notification is sent to the user system identifying a latest version of the particular key, at a second frequency type 1 mark (e.g., following a second 15 minute interval), a second notification is sent to the user system identifying an updated latest version of the particular key, and so on. Advantageously, each notification sent in accordance with the selected frequency type includes information relating to the particular key following the execution of multi-level (e.g., local and global de-duplication processing) frequency-based de-duplicated data.

Figure 6:
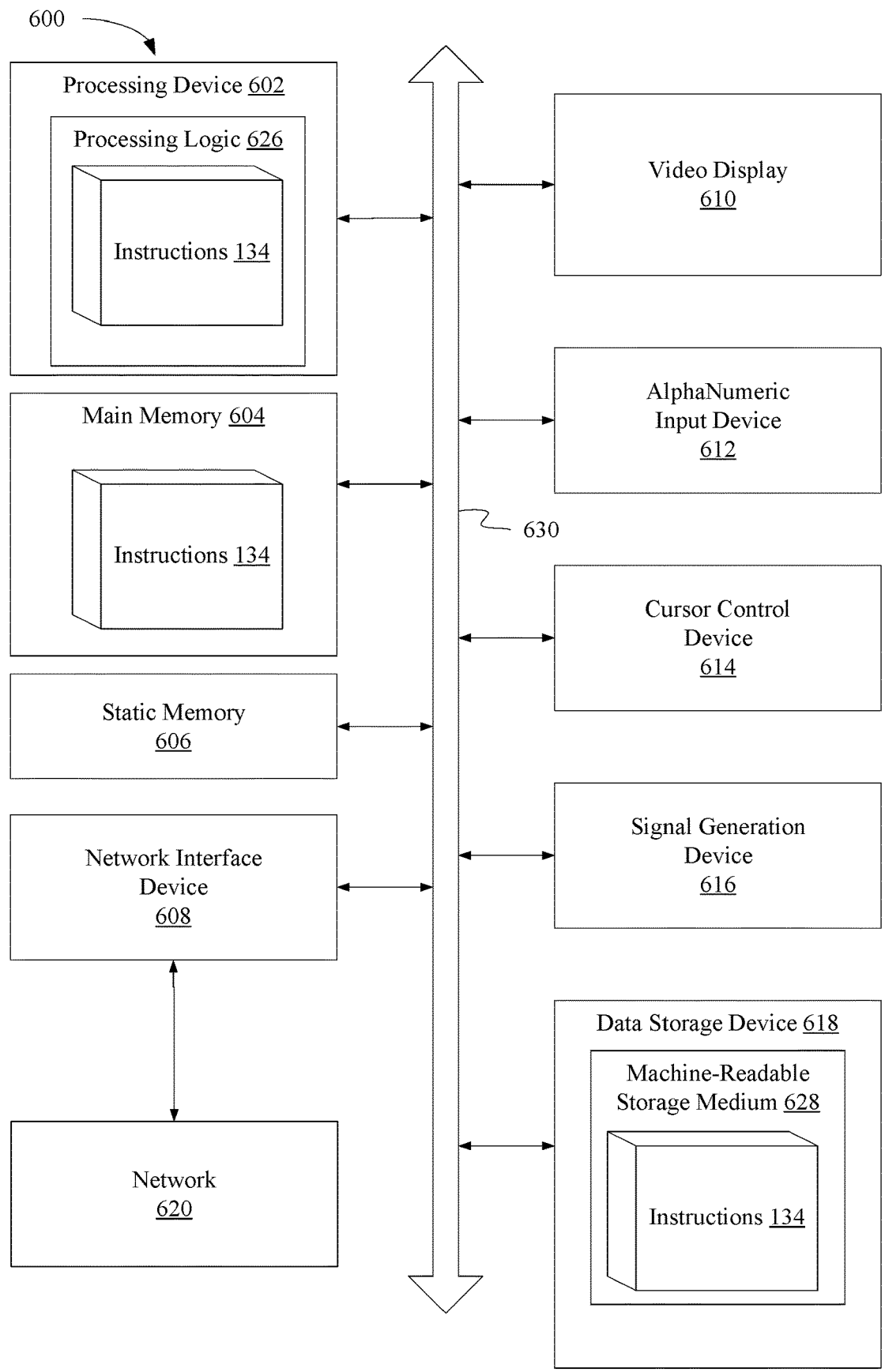
FIG. 6 is a schematic block diagram that provides one example illustration of a computing device executing multi-level de-duplication processing, in accordance with embodiments of the present disclosure.

FIG. 6 illustrates a diagrammatic representation of a machine in the exemplary form of a computer system (computing device) 600 within which a set of instructions, for causing the machine to perform any one or more of the methodologies discussed herein, may be executed. The system 600 may be in the form of a computer system within which a set of instructions, for causing the machine to perform any one or more of the methodologies discussed herein, may be executed. The system may be a single compute node in an on-demand configurable pool of shared computing resources in some embodiments. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, compute node, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (e.g., a processor) 602, a main memory device 604 (e.g., read-only memory (ROM), flash memory, dynamic random access memory (DRAM) such as synchronous DRAM (SDRAM)), a static memory device 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 134 for a multi-level data de-duplication system (e.g., multi-level data de-duplication system 100 of FIG. 1) for performing the operations discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions of synchronization logic 108 embodying any one or more of the methodologies or functions described herein. The instructions may also reside, completely or at least partially, within the main memory 604 and/or within processing logic of the processing device 602 during execution thereof by the computer system 600, the main memory 604 and the processing device 602 also constituting computer-readable media.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. In the above description, numerous details are set forth.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions using terms such as "adding", "receiving", "storing", "generating", "sending", "performing", "writing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Accordingly, it will be appreciated that a variety of programming languages, specification languages and/or verification tools may be used to implement the teachings of the embodiments of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a first computing instance of a first set of computing instances, a first portion of a set of data records collected during a time period;
   receiving, by a second computing instance of the first set of computing instances, a second portion of the set of data records collected during the time period;
   executing, by the first computing instance of the first set of computing instances, at a first time, a first de-duplication operation corresponding to the first portion of the set of data records to generate a first set of locally de-duplicated files;
   executing, by the second computing instance of the first set of computing instances, at the first time, a second de-duplication operation corresponding to the second portion of the set of data records to generate a second set of locally de-duplicated files;
   receiving, by a first computing instance of a second set of computing instances, at a second time corresponding to a frequency type, a first portion of the first set of locally de-duplicated files corresponding to a particular key and a second portion of the second set of locally de-duplicated files corresponding to the particular key;
   executing, by the first computing instance of the second set of computing instances, a third de-duplication operation corresponding to the particular key to generate a multi-level de-duplicated file identifying a latest version of the particular key; and
   providing a notification associated with the multi-level de-duplicated file to a user system associated with the particular key.

2. The method of claim 1, wherein executing the first de-duplication operation comprises determining the first portion of the set of data records comprises a first version of the particular key and a second version of the particular key; wherein the first set of locally de-duplicated files comprises the second version of the particular key and does not comprise the first version of the particular key.

3. The method of claim 1, wherein the frequency type represents a frequency associated with the executing of the third de-duplication operation; and wherein the frequency type is selected by the user system.

4. The method of claim 1, wherein executing the third de-duplication operation comprises determining the first portion of the first set of locally de-duplicated files comprises a first version of the particular key and the second set of locally de-duplicated files comprises the latest version of the particular key; wherein the multi-level de-duplicated file comprises the latest version of the particular key and does not comprise the first version of the particular key.

5. The method of claim 1, further comprising:
   determining a file size associated with a first file of the first set of locally de-duplicated files exceeds a maximum threshold level; and
   increasing a number of computing instances of the first set of computing instances.

6. The method of claim 1, further comprising:
   determining a file size associated with a first file of the first set of locally de-duplicated files is less than a minimum threshold level; and
   decreasing a number of computing instances of the first set of computing instances.

7. The method of claim 1, further comprising:
   receiving, by a second computing instance of the second set of computing instances, at a third time corresponding to a second frequency type, a first portion of the first set of locally de-duplicated files corresponding to another particular key and a second portion of the second set of locally de-duplicated files corresponding to the another particular key;
   executing, by the second computing instance of the second set of computing instances, a fourth de-duplication operation corresponding to the another particular key to generate a second multi-level de-duplicated file identifying a latest version of the another particular key; and
   providing another notification associated with the second multi-level de-duplicated file to a second user system associated with the another particular key.

8. A system comprising:
a first set of computing instances to execute a first set of de-duplication operations to generate a set of locally de-duplicated files associated with a data stream comprising a plurality of data records associated with a plurality of user systems;
a storage system to store the set of locally de-duplicated files; and
a second set of computing instances to:
receive, in accordance with a frequency type of a plurality of frequency types, the set of locally de-duplicated files from the storage system; and
execute a second set of de-duplication operations to generate a set of globally de-duplicated files associated with the plurality of data records.

9. The system of claim 8, further comprising:
a first data streaming component comprising a set of shards, the first data streaming component to:
receive the plurality of data records from a service associated with the plurality of user systems; and
randomly assign each of the plurality of data records to a respective shard of the set of shards.

10. The system of claim 9, wherein a first computing instance of the first set of computing instances receives, following a time period, a first portion of the plurality of data records collected by a first shard of the set of shards during the time period; and wherein a second computing instance of the first set of computing instances receives, following the time period, a second portion of the plurality of data records collected by a second shard of the set of shards during the time period.

11. The system of claim 8, further comprising:
a file system to:
maintain the set of locally de-duplicated files; and
periodically flush the set of locally de-duplicated files to the storage system.

12. The system of claim 8, wherein a first frequency type of the plurality of frequency types is associated with a first user system of the plurality of user systems and a second frequency type of the plurality of frequency types is associated with a second user system of the plurality of user systems.

13. The system of claim 12, wherein a first computing instance of the second set of computing instances receives, at periodic intervals corresponding to the first frequency type, one or more locally de-duplicated files associated with a first set of data records relating to a first key associated with the first user system.

14. The system of claim 13, wherein the first computing instance of the second set of computing instances executes, at the periodic intervals corresponding to the first frequency type, a de-duplication operation of the second set of de-duplication operations to identify a latest version of a particular key associated with the first user system.

15. The system of claim 13, wherein a second computing instance of the second set of computing instances receives, at periodic intervals corresponding to the second frequency type, one or more locally de-duplicated files associated with a second set of data records relating to a second key associated with the second user system.

16. The system of claim 8, wherein a file size associated with a first file of the set of locally de-duplicated files exceeds a maximum threshold level; and wherein a number of computing instances of the first set of computing instances is increased.

17. The system of claim 8, wherein a file size associated with a first file of the set of locally de-duplicated files is less than a minimum threshold level; and wherein a number of computing instances of the first set of computing instances is decreased.

18. A non-transitory computer-readable storage device storing computer-executable instructions that, if executed by a processing device, cause the processing device to perform operations comprising:
receiving, by a first computing instance of a first set of computing instances, a first portion of a set of data records collected during a time period;
receiving, by a second computing instance of the first set of computing instances, a second portion of the set of data records collected during the time period;
executing, by the first computing instance of the first set of computing instances, at a first time, a first de-duplication operation corresponding to the first portion of the set of data records to generate a first set of locally de-duplicated files;
executing, by the second computing instance of the first set of computing instances, at the first time, a second de-duplication operation corresponding to the second portion of the set of data records to generate a second set of locally de-duplicated files;
receiving, by a first computing instance of a second set of computing instances, at a second time corresponding to a frequency type, a first portion of the first set of locally de-duplicated files corresponding to a particular key and a second portion of the second set of locally de-duplicated files corresponding to the particular key;
executing, by the first computing instance of the second set of computing instances, a third de-duplication operation corresponding to the particular key to generate a multi-level de-duplicated file identifying a latest version of the particular key; and
providing a notification associated with the multi-level de-duplicated file to a user system associated with the particular key.

19. The non-transitory computer-readable storage device of claim 18, the operations further comprising determining the first portion of the set of data records comprises a first version of the particular key and a second version of the particular key; wherein the first set of locally de-duplicated files comprises the second version of the particular key and does not comprise the first version of the particular key.

20. The non-transitory computer-readable storage device of claim 18, wherein executing the third de-duplication operation comprises determining the first portion of the first set of locally de-duplicated files comprises a first version of the particular key and the second set of locally de-duplicated files comprises the latest version of the particular key; wherein the multi-level de-duplicated file comprises the latest version of the particular key and does not comprise the first version of the particular key.

* * * * *